June 26, 1962    J. MORKOSKI ETAL    3,040,819
ROTARY HOE WHEEL

Filed Aug. 24, 1960    2 Sheets-Sheet 1

INVENTORS
James Morkoski
Eugene J. Birkenbach
Atty.

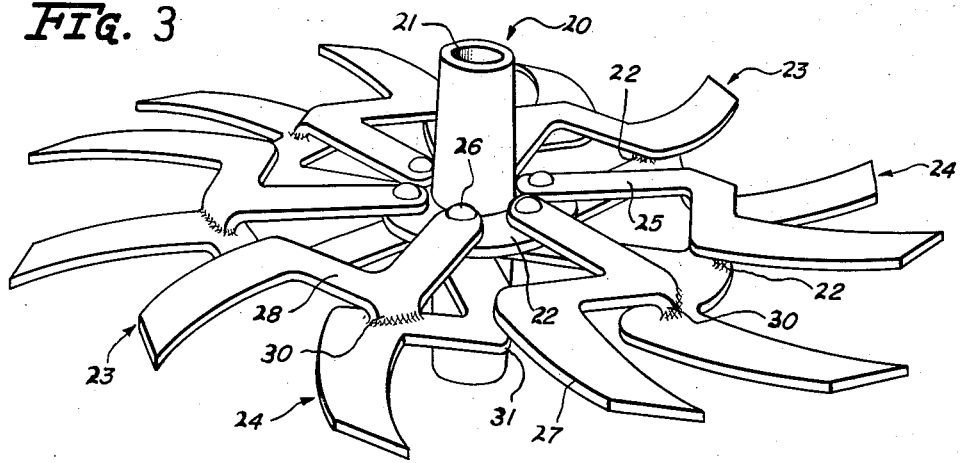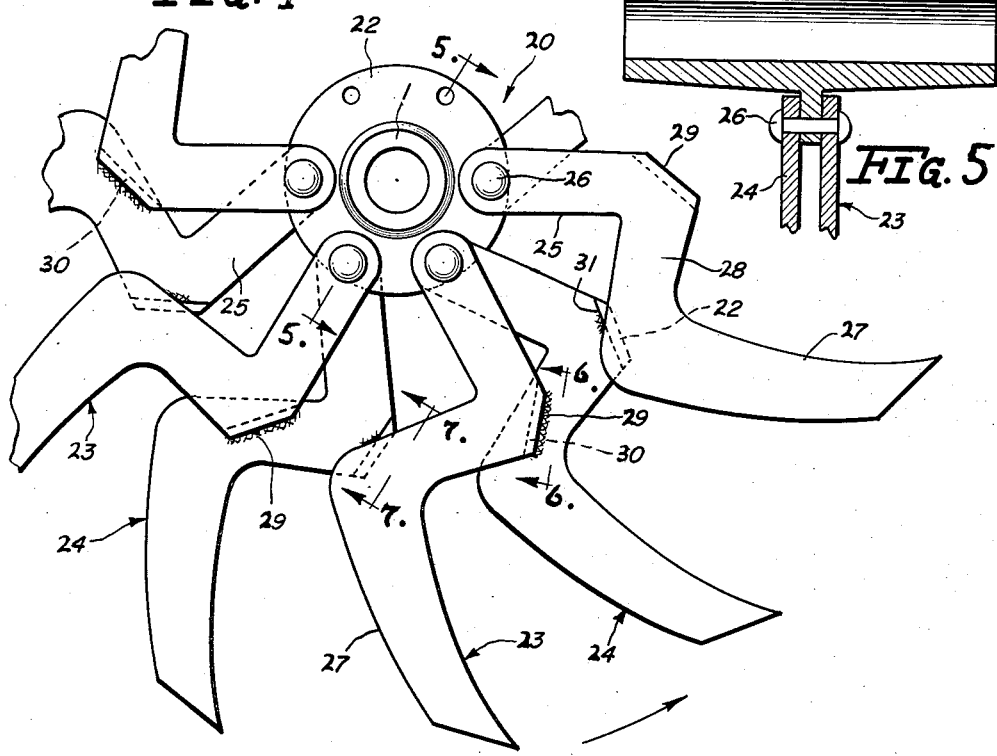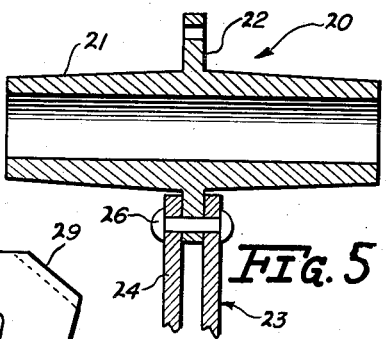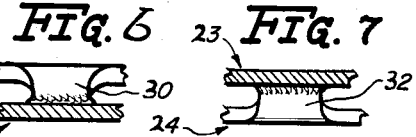

United States Patent Office 3,040,819
Patented June 26, 1962

3,040,819
ROTARY HOE WHEEL
James Morkoski, Clarendon Hills, and Eugene J. Birkenbach, Park Ridge, Ill., assignors to International Harvester Company, Chicago, Ill., a corporation of New Jersey
Filed Aug. 24, 1960, Ser. No. 51,643
12 Claims. (Cl. 172—556)

This invention relates to agricultural implements and particularly to an earthworking wheel of the rotary hoe type.

Rotary hoe wheels are widely known and used for effecting pulverization of the soil, and usually consist of a hub to which are anchored circumferentially spaced radial spikes or teeth, a number of wheels being placed side by side to pulverize a relatively broad area of ground. In the conventional rotary hoe wheel the teeth are disposed in a common plane, and an object of this invention is the provision of an improved earthworking wheel wherein the teeth are arranged in spaced relationship with reference to the axis of the wheel to provide an axial spacing between adjacent teeth at their outer earth penetrating ends to pulverize a wider area than is possible with a conventional wheel.

Another object of the invention is the provision of an improved rotary hoe wheel wherein the teeth are circumferentially arranged in axially spaced outwardly diverging groups, and wherein means are provided for strengthening the teeth and holding them in the prescribed relationship.

A further object of the invention is the provision of an improved toothed wheel wherein the teeth are of such a conformation that it is possible to secure one to the other at a location medially of the ends of said teeth, whereby the teeth mutually reinforce each other.

Another object of the invention is the provision of a novel tooth for an earthworking spike or tooth wheel wherein the tooth comprises an inner radially extending portion secured to the wheel hub, a radially outer earth-penetrating portion, and an angularly directed central portion which is secured to the corresponding central portions of the adjacent teeth.

Other objects and advantages of the invention will become clear from the following detailed description when read in conjunction with the accompanying drawings, wherein:

FIGURE 3 is a view in perspective of a modified form of rotary hoe wheel of this invention;

FIGURE 4 is a plan view of an enlarged scale of a portion of the wheel of FIGURE 3;

FIGURE 5 is a section taken on line 5—5 of FIGURE 4;

FIGURE 6 is a section taken on the line 6—6 of FIGURE 4; and

FIGURE 7 is a section taken on the line 7—7 of FIGURE 4.

Figure 1:
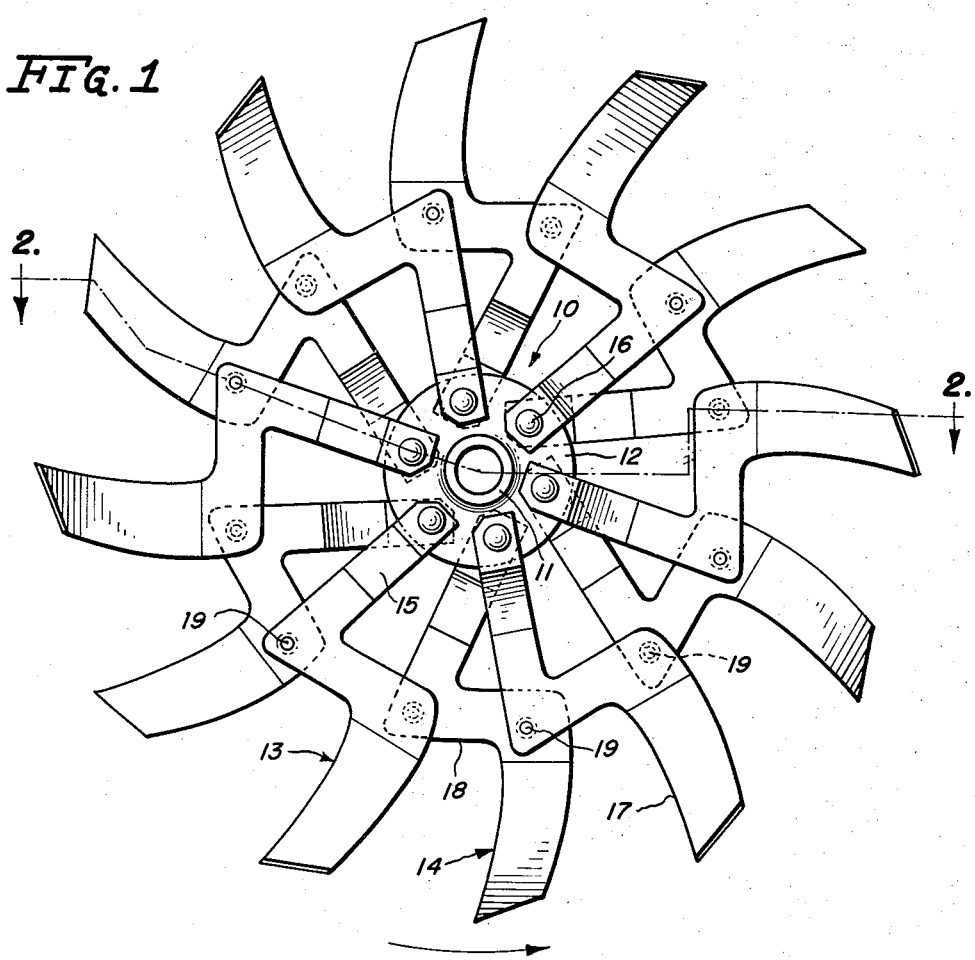
FIGURE 1 is a plan view of a rotary hoe wheel incorporating the features of this invention.

In the drawings the hub of the rotary hoe wheel according to this invention is designated by the numeral 10 and comprises an axially extending bearing section or portion 11 adapted to be mounted upon and axially bored to receive a shaft, not shown.

Affixed to the bearing section 11 centrally thereof is a radial flange or plate section 12 which serves to anchor two groups of spikes or teeth 13 and 14, circumferentially arranged on opposite sides of the plate section 12. The teeth 13 and 14 are substantial duplicates, each consisting of an inner portion 15 secured at its inner end to the plate section 12 by a rivet 16.

Each of the teeth 13 and 14 also has an outer radial section 17 which is offset from the inner section and connected thereto by an angularly directed central portion 18, forming a tooth which, when viewed from one side thereof, is generally in the shape of the capital letter S.

The teeth on opposite sides of the plate section 12 are arranged in pairs and the inner ends of each pair of teeth are mounted upon a common rivet 16.

Figure 2:
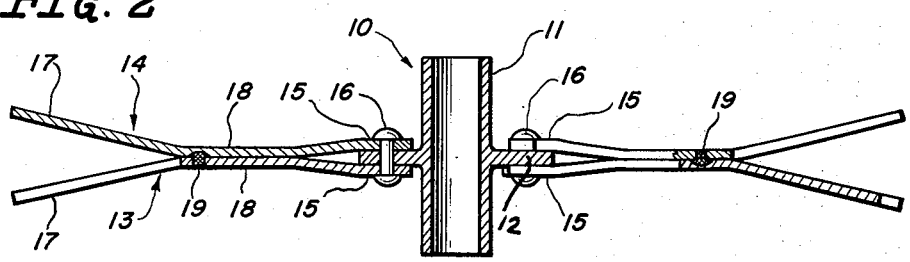
FIGURE 2 is a section taken along the line 2—2 of FIGURE 1.

The teeth 13 and 14 of each pair of teeth are axially spaced at their inner ends by the thickness of the flange or plate section 12, and converge toward the central portions thereof until they engage, as shown in FIGURE 2. The outer sections 17 then diverge to provide teeth with their outer ends axially spaced and adapted to revolve in separate planes.

In order to strengthen the wheel and hold the teeth in the relationships shown in the drawing, the leading end of the central angularly directed section 18 of each tooth is affixed to the trailing end of the central section 18 of the adjacent tooth at 19 by welding or the like to form a concentric band of inner connected central tooth sections causing the teeth to reinforce each other and strengthen the wheel to withstand the ground forces acting upon the outer, earth penetrating sections of the teeth.

The teeth 13 and 14 of each pair diverge circumferentially as shown in FIGURE 1, and, as shown in FIGURE 2, they also diverge in an axial direction with respect to a plane through the flange or plate 12. In FIGURE 2 the outer ends of the teeth are shown as relatively widely spaced in order to cultivate a relatively wide band of earth with a single wheel, although it should be understood that such diversion is not needed if it is desired that a band of less width be worked.

In the modification shown in FIGURES 3 to 7 the numeral 20 designates the hub of a rotary hoe wheel which comprises an axially extending bearing section or portion 21, similar to that shown in FIGURES 1 and 2.

Affixed to the bearing section 21 centrally thereof is a radial flange or plate section 22 which serves to anchor two groups of spikes or teeth 23 and 24 similar to those shown in FIGURES 1 and 2, circumferentially arranged on opposite sides of the plate section 22. The teeth 23 and 24 are substantial duplicates, cut from a common pattern, each consisting of an inner portion 25 secured at its inner end to the plate section 22 by a rivet 26.

Each of the teeth 23 and 24 also has an outer radial section 27 which is circumferentially off-set from the inner portion and connected thereto by an angularly directed central connecting portion 28.

The inner ends of the teeth on opposite sides of the plate section 22 are also mounted upon a common rivet 26.

The teeth 23 and 24 of each pair of teeth diverge circumferentially, and they also diverge in an axial direction with respect to a plane through the flange or plate 22.

In order to strengthen the wheel and hold the teeth in the relationship shown in the drawing, the leading edge 29 of each tooth 23 is turned axially inwardly to provide a spacer in the form of a lug 30 which is affixed, as by welding, to the connecting portion of the adjacent tooth 24 of the pair. The leading edge 31 of the connecting portion 28 of the adjacent tooth 24 is also turned axially inwardly in the direction opposite that of the edge 29 and forms a spacer or lug 32 which is welded to the receding edge of central portion 28 of the tooth 23 of the next pair.

All of the teeth are interconnected in this manner and the angularly related central portions 28 of the teeth form an annular strengthening structure in which the teeth reinforce each other. Furthermore, the radial dimension of the lugs 30 and 32 is greater than the thickness of the plate section 22 so that the teeth 23 and 24 of each pair are spaced farther apart axially at the outer earth penetrating ends thereof than at the plate section 22 and are held rigidly in this position.

It is believed that the operation as well as the construction of the novel rotary hoe wheel of this invention will be clearly understood from the foregoing description. It should likewise be understood that the invention has been described in its preferred embodiments only, and that modifications may be made therein without departing from the spirit of the invention or the scope of the appended claims.

What is claimed is:

1. An earthworking wheel comprising a hub having a radial plate section, a plurality of radial teeth circumferentially arranged around said plate section and having the inner ends of said teeth anchored thereto, each of said teeth being bent to provide a central section directed in an angular path, the central section of each of said teeth having at least one edge thereof substantially in axial alignment with an edge of the adjacent tooth, and means for securing the central sections of said adjacent teeth together.

2. The invention set forth in claim 1, wherein said edges of said teeth are in overlapping relation.

3. An earthworking wheel comprising a hub having a radial plate section, a plurality of radial teeth arranged in radially outwardly diverging pairs circumferentially of said hub, means for anchoring the inner ends of the teeth of each pair to opposite sides of said plate section, each tooth of each pair being of such a conformation as to engage the other and the adjacent teeth at a location medially of the ends thereof, and means for securing each tooth to an adjacent tooth at said location to form a concentric strengthening band section.

4. The invention set forth in claim 3, wherein the teeth of each pair converge axially from their inner ends to said band section and diverge axially from said band section to the outer ends thereof.

5. An earthworking wheel comprising a hub portion and a plurality of circumferentially spaced teeth having their inner ends anchored to said hub portion, each of said teeth having generally radially extending inner and outer portions and a generally angularly directed central portion connecting said inner and outer portions, the central portion of each of said teeth being secured to the central portion of the adjacent teeth to form a concentric strengthening band.

6. The invention set forth in claim 5, wherein each of said teeth is generally S-shaped.

7. The invention set forth in claim 5, wherein the radially outer portions of adjacent teeth diverge outwardly.

8. The invention set forth in claim 5, wherein said teeth are arranged in circumferentially spaced pairs about said hub and the inner ends of the teeth of each pair are secured together in overlapping relation.

9. An earthworking wheel comprising a hub, a plurality of radial teeth mounted at their inner ends on said hub with alternate teeth being axially spaced at their outer ends, spacer means integral with each of said teeth medially of the ends thereof and extending generally axially therefrom, the spacer means on each of said teeth being engageable with an adjacent tooth to maintain the axial spacing therebetween, and means for securing said spacer means to said adjacent tooth to form an annular reinforcing section between the hub and the periphery of the wheel.

10. An earthworking rotary wheel comprising a hub having an axial bearing section and a radial plate section, a plurality of radial teeth having their inner ends affixed to said plate section, alternate teeth being secured to opposite sides of said plate section and diverging from the plane thereof whereby the axial spacing between the radially outer ends of the teeth on opposite sides of said plate section is greater than between the inner ends thereof, axially extending spacer means medially of the ends of each of said teeth and integral therewith and affixed to the adjacent tooth on the opposite side of said plate section for forming a concentric reinforcing section and holding said teeth in axially spaced relationship.

11. An earthworking wheel including a hub having an axial bearing section, a radial plate section, a plurality of radial teeth arranged circumferentially about said plate section on opposite sides thereof to provide two groups of axially spaced teeth, each said tooth comprising an inner portion secured to said plate section, an outer earth engaging portion circumferentially offset from said inner portion, and a central angularly directed connecting portion, and an axially directed spacer formed on each of said teeth at said central portion and secured to the adjacent tooth on the opposite side of said plate section to maintain the axial spacing therebetween.

12. The invention set forth in claim 11, wherein the teeth on opposite sides of said plate section diverge toward their outer ends and are held in said relationship by said spacer.

References Cited in the file of this patent

UNITED STATES PATENTS

| | | |
|---|---|---|
| 1,300,442 | Matoushek | Apr. 5, 1919 |
| 2,477,662 | Seaman | Aug. 2, 1949 |
| 2,560,369 | McCardell | July 10, 1951 |
| 2,903,077 | Kamlukin | Sept. 8, 1959 |